J. H. TOUPET.

TILE FOR FLOOR STRUCTURES.

APPLICATION FILED MAR. 1, 1922.

Reissued May 30, 1922.

15,369.

2 SHEETS—SHEET 1.

INVENTOR

Julius H. Toupet by W. G. Doolittle his attorney

J. H. TOUPET.

TILE FOR FLOOR STRUCTURES.

APPLICATION FILED MAR. 1, 1922.

Reissued May 30, 1922.

15,369.

2 SHEETS—SHEET 2.

INVENTOR

Julius H. Toupet by W. G. Doolittle his attorney

UNITED STATES PATENT OFFICE.

JULIUS H. TOUPET, OF PITTSBURGH, PENNSYLVANIA.

TILE FOR FLOOR STRUCTURES.

15,369. Specification of Reissued Letters Patent. Reissued May 30, 1922.

Original No. 1,404,710, dated January 24, 1922, Serial No. 779,139, filed July 15, 1913. Application for reissue filed March 1, 1922. Serial No. 540,267.

*To all whom it may concern:*

Be it known that I, JULIUS H. TOUPET, a citizen of France, residing at Pittsburgh, in the county of Allegheny and State of Pennsylvania, have invented certain new and useful Improvements in Tiles for Floor Structures, of which the following is a full, clear, and exact description, reference being had to the accompanying drawings, forming part of this specification, in which.

My invention has relation to composite floor structures, and is designed to provide a structure of this character which will possess many points of superiority over those previously known. Some of the more important advantages of the invention will hereinafter appear.

The nature of my invention will be best understood by reference to the accompanying drawings, in which I have shown the preferred embodiment thereof and which will now be described, it being premised, however, that many changes may be made in the details of construction without departing from the spirit and scope of my invention as defined in the appended claims.

Figure 2:
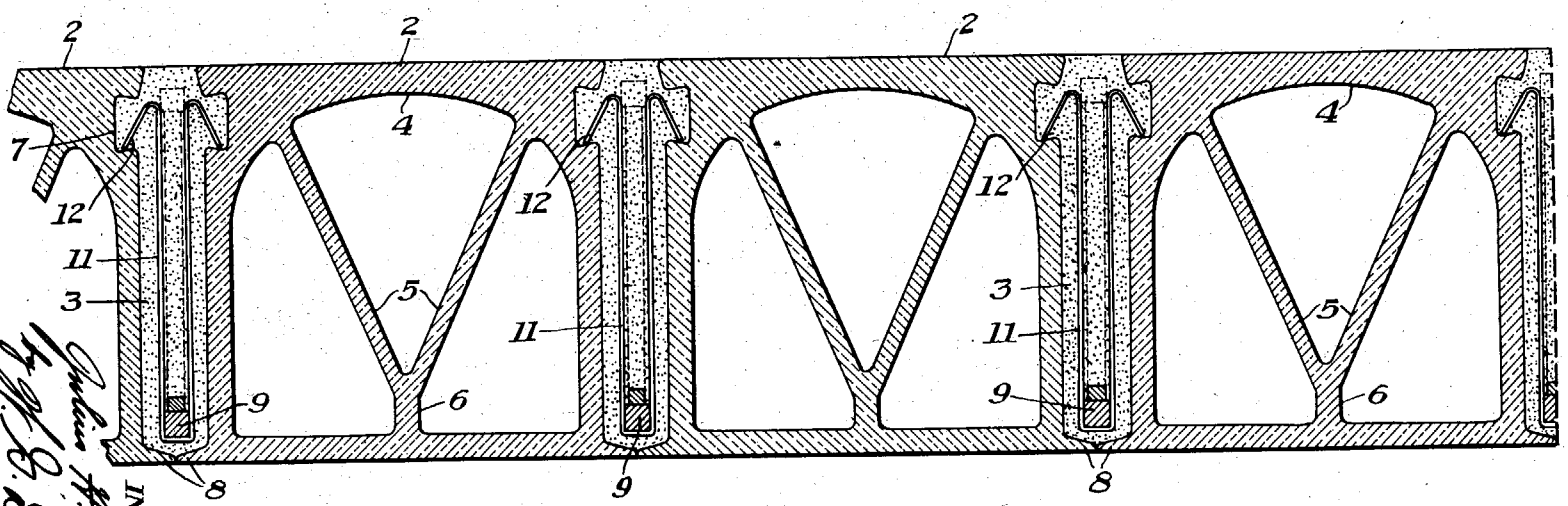
Figs. 2 and 3 are sections on a larger scale taken respectively on the lines II—II and III—III of Fig. 1.
Figure 3:
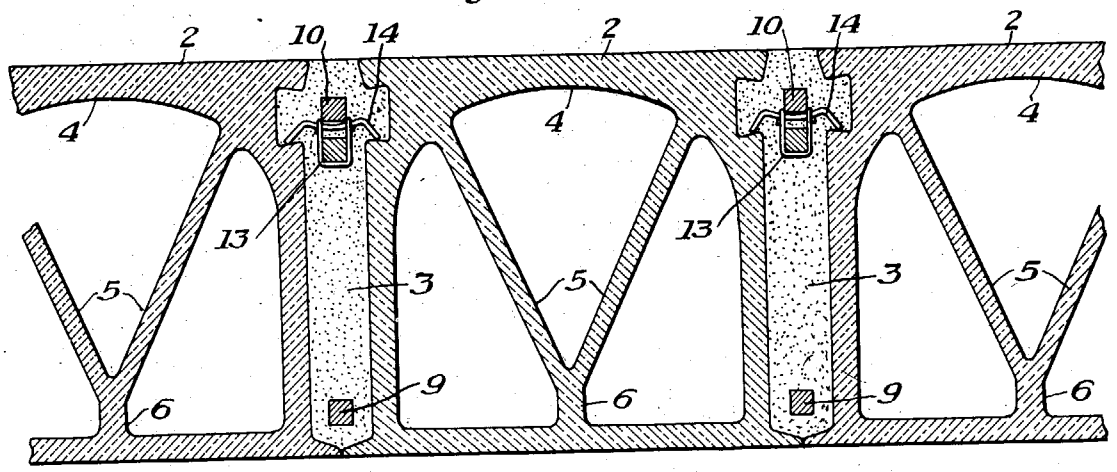
Figure 4:
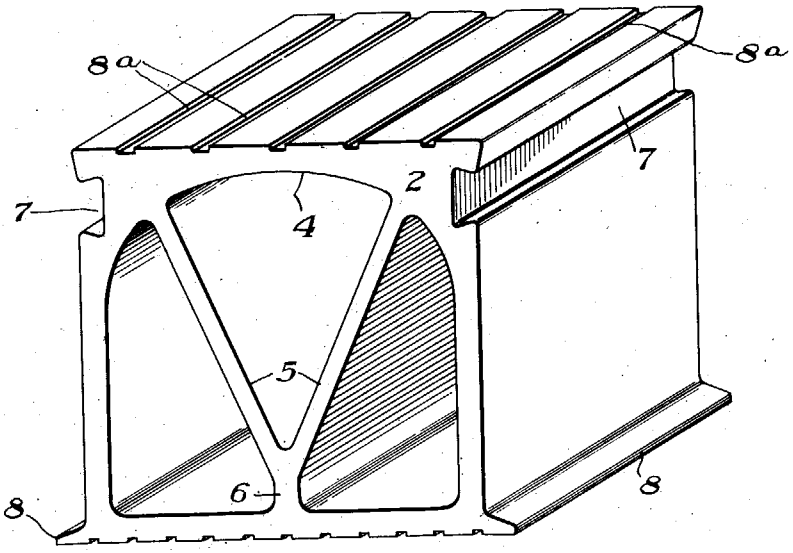
Fig. 4 is a perspective view of one of the tiles.

In my improved structure, the main compression member of the structure is composed of tiles, preferably of burnt clay, although cement or concrete tiles may be employed. These tiles, which are indicated generally at 2 in the drawings, are laid in longitudinal parallel courses, the tiles in each course being placed end to end, but adjacent courses being separated from each other laterally, as shown in Figs. 2 and 3. The spaces separating the adjacent courses are filled with a plastic material 3, which may be suitably reinforced with metal. This plastic material should be of a carefully made composition which will possess substantially the same strength or resistance to compressive loads, per unit of area, as the compressive resistance of the tile, whereby the floor structure is of uniform strength. This constitutes an important feature of my invention. I prefer to employ a mixture of cement and fine material, such as sand. If concrete is employed, the mixture should be rich enough and so proportioned as to give it the relative strength above stated.

The tiles 2 are of special form. They are made hollow with the interior top arch 4, whereby their resistance to compressive and direct loads is greatly increased. For general use, especially in larger structures and with larger sizes of tiles, I prefer to also construct them with the interior V-webs 5, the downwardly converging arms of the V being joined to the bottom wall of the tile by a relatively short vertical centrally arranged web 6. These webs not only greatly increase the strength of the tiles, but they divide the hollow interior of each tile into three cells, any one of which may be used as a conduit for pipes, or may be broken into and used for anchorage purposes, independently of the other cells. Where it is necessary to fill the interior of the tile for anchorage or other purposes, this filling can be confined to the single cell so used, thus greatly decreasing the weight of the structure as well as saving the material. The particular arrangement of webbing may, however, be changed, and for smaller tiles may be entirely omitted.

Each tile is also preferably formed on each of its lateral faces near its upper end with a longitudinal groove 7, extending from end to end thereof, and preferably somewhat dovetailed in form. These grooves serve a number of important functions. They constitute an effective bonding means for the plastic fillings 3. They also give these fillings a shear engagement with the tiles, whereby greater area of the structures is placed in shear, and they also form supporting means for the metal reinforcements or ties in the manner hereinafter described. In some cases, however, these grooves may be omitted, where the adhesion of the cement or plastic material is great enough or where the longitudinal shear is small, or in cases where the grooves would fall below the computed neutral axis of the structure, where the longitudinal shear decreases rapidly.

Each tile is also formed at the bottom with a laterally projecting flange 8, these flanges abutting each other below the plastic material in the manner clearly shown in Figs. 2 and 3. This constitutes one important feature of my invention, since it provides a continuous bottom surface of tiles to receive plaster, etc., thereby preventing any discoloration of the applied plaster due to moisture in the plastic material. This construction also gives a double protection to the metallic reinforces, these being protected from below both by these abutting flanges and by the plastic material in which they are embedded. The upper and lower surfaces of the tiles may also be longitudinally grooved, as indicated at 8[a], if desired, in order to provide a better bond for cement or composition floors or other finished floorings, or for the application of ceiling plaster.

Any suitable system of metal reinforces may be employed. In the drawings, I have shown each of the plastic bodies as having embedded therein the tension members 9 and the compression members 10. The tension members may be supported, as shown in Fig. 2, by means of straps or stirrups 11, which extend upwardly and have hooked upper end portions 12, which engage the bottom walls of the tile grooves 7. Where tension members are provided in the upper portion of the structure, as shown in Fig. 3, the stirrups 13 may be employed, these being engaged by the cross members 14, which rest upon the bottom walls of the grooves 7. This particular system of reinforce, however, is not material to my invention, since, as stated, any desired system may be employed. One of the advantages of my invention, however, is that it enables the use of very much less steel in the construction for a given strength than is ordinarily required, owing to the great strength of the construction itself.

The construction described gives an ideal T-beam structure, which, with the use of a minimum amount of steel, will, for a given load, give less deflection and will be much lighter and more fireproof than the constructions heretofore employed. While the construction is adapted to spans of widely varying length, it is particularly well adapted to relatively long spans, such as spans of from twelve to thirty-six feet. The construction is also very largely sound-proof, due to the form of the tiles, their hollow interiors being broken up into separate cells and sound vibrations being compelled to pass through a number of separated walls in passing through the tiles. These also form a protection against fire, since, should the bottom walls of the tiles drop out, the webs still give protection to the top which is the real or necessary compression member of the floor structure.

The floor is easily laid, and requires much less centering and support than is ordinarily needed, by reason of the shape and lightness of the tiles. Owing to the arched form of the tiles, combined with the bracing action of the interior webs, the structure is exceedingly strong and obviates the necessity for placing a thick layer of concrete over the tiles in order to give the necessary compression strength. Owing to the fact that the plastic material employed has substantially the same resistance, per unit area, to compression loads, all portions of the structure are of equal strength, and the total strength is, of course, very much greater than would be the case if ordinary concrete were employed. As above stated, the tiles form the main compression member of the floor, instead of acting as mere fillers. They can be manufactured purposely to give the necessary compression strength for any particular case. Their cost is very little, if any, greater than that of ordinary tiles. Owing to the arched shape of the tiles, they are not broken as easily as ordinary tiles. The bottom flanges 8 are relatively narrow, and hence permit the tiles to be readily manufactured and handled with a minimum amount of breakage of such flanges. These flanges also permit the tiles to be laid either crosswise or lengthwise of the boards upon an open centering, without leakage of the cement between the centering boards.

The floor structure herein described and claimed is distinctly differentiated from floor structures of the flat arch type. It is a floor structure or slab constructed in accordance with what is known as the straight line formula and in which the amount of tile material in compression above the neutral axis of the slab multiplied by the average compressive stress to which such material is subjected is equal to the area of the reinforced metal in tension multiplied by the allowable tension stresses on such reinforcing material. The tile members of the structure or slab, instead of acting as mere fillers, as in some types of construction, or instead of being in compression throughout their depth as in the flat arch type of construction, are subject to compression only above the neutral axis of the slab. These tile members act with the interposed plastic bodies and the reinforced members in such a manner as to form monolithic beams.

Figure 1:
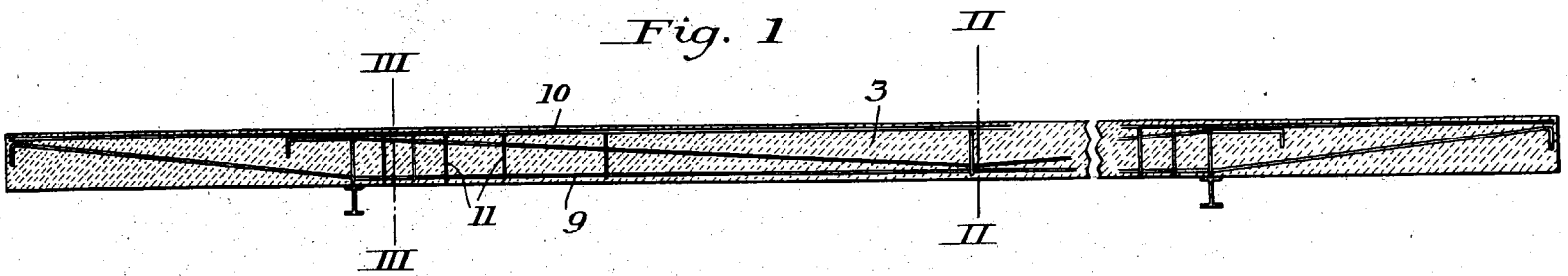
Fig. 1 is a longitudinal section of a floor structure or slab embodying my invention.

The interposed plastic bodies must be of sufficient area in cross section to enable them to form a substantial part of the structure. In practice, they should not be less than one-seventh of the area occupied by the tiles, and preferably occupy a space equal to about one-sixth of the tile area. It will be noted that the entire metal reinforcement is carried in these plastic bodies, the tiles themselves being entirely without reinforces or connections one with another. It will also be noted from Figs. 1, 2 and 3, that the reinforces are so arranged as to provide ample reinforcement above the neutral axis of the structure at the end portions of the spans.

I claim:

1. A hollow tile for floor structures having substantially flat upper and lower surfaces, the top portion of the tile being of increasing thickness from its center toward each of its lateral edges, and supported by downwardly converging bracing webs, said tail having longitudinal grooves on its lateral surfaces above the neutral axis of the tile having longitudinal grooves on its lattom ribs whose lower surfaces form continuations of the lower surface of the bottom of the tile; substantially as described.

2. A hollow tile for floor structures having substantially flat upper and lower surfaces, the top portion of the tile being of increasing thickness from its center toward each of its lateral edges and supported by a bracing web-structure connecting the upper and lower portions of the tile, said tile having longitudinal grooves on its lateral surfaces above the neutral axis of the tile, and also having lateral projecting bottom ribs whose lower surfaces form continuations of the lower surface of the bottom of the tile.

3. A hollow tile for floor structures having top and bottom portions which have substantially flat exterior surfaces, the top portion of the tile being substantially thicker than the other portions, downwardly converging bracing webs disposed between the top and bottom portions, said tile having grooves in its lateral surfaces above the neutral axis of the tile and spaced downwardly from the top thereof, and having laterally projecting bottom ribs whose lower surfaces form continuations of the lower surface of the bottom of the tile.

4. A hollow tile for floor structures having top and bottom portions with substantially flat exterior surfaces, the top portion of the tile being of increasing thickness from its center toward each of its lateral edges, downwardly converging bracing webs interposed between the top and bottom portions, and laterally projecting bottom ribs on the lower portion of the tile whose lower surfaces form continuations of the bottom face of the tile.

5. A hollow tile for floor structures having top and bottom portions which have substantially flat exterior surfaces, the top portion of the tile being of increasing thickness from its center toward each of its lateral edges, side walls connecting the top and bottom portions, downwardly converging webs between the top and bottom portions, said tile having longitudinal grooves on its lateral surfaces above the neutral axis of the tile and spaced downwardly from the top surface thereof.

6. In a floor structure, the combination with two adjacent tiles, each tile having a groove in its side face above its neutral axis and below the top face thereof, a reinforcing member disposed between the tiles, and a stirrup entered in said grooves for supporting said reinforcing member.

7. In a floor structure, the combination with two adjacent tiles, each tile having a groove in each of its side faces above its neutral axis and below the top face thereof, of a reinforcing member disposed between the tiles, a hanger engaging said grooves for supporting said reinforcing member and a binder filling said grooves and the space between the tiles.

8. In a floor structure, the combination with two adjacent tiles, each tile having an arched span increasing in thickness from its center towards its sides and having grooves in said thickened portions, of a reinforcing member disposed between the tiles, a hanger engaging said grooves for supporting said reinforcing member and a binder filling said grooves and the space between the tiles.

9. In a building structure, a hollow tile having a top wall consisting of an arched span increased in thickness from its center towards each side, whereby pressure thereon will be converted into lateral thrust and grooves extending through the exterior faces of the side walls into the thickened portions of the arched span.

10. In a building structure, a hollow tile having a top wall consisting of an arched span increased in thickness from its center towards each side, whereby pressure thereon will be converted into lateral thrust, webs connected to and bracing the top wall, and grooves in the exterior faces of the side walls extending into the thickened portions of the arched span.

11. In a building structure, a hollow tile having a top wall consisting of an arched span increased in thickness from its center towards each side, whereby pressure thereon will be converted into lateral thrust, webs connected to and bracing the top wall, laterally projecting flanges at the bottom of the tile and grooves extending through the exterior faces of the side walls into the thickened portions of the arched span.

In testimony whereof I have hereunto set my hand this 9th day of February, 1922.

JULIUS H. TOUPET.

Witnesses:
WM. H. PARMELEE,
LOIS WINEMAN.

Certificate of Correction.

It is hereby certified that in Reissue Letters Patent No. 15,369, granted May 30, 1922, upon the application of Julius H Toupet, of Pittsburgh, Pennsylvania, for an improvement in "Tiles for Floor Structures," errors appear in the printed specification requiring correction as follows: Page 3, line 2, claim 1, for the word "tail" read *tile;* same page and claim, line 4, strike out the words and syllable "having longitudinal grooves on its lat-" and insert instead , *and also having lateral projecting bot-;* and that the said Letters Patent should be read with these corrections therein that the same may conform to the record of the case in the Patent Office.

Signed and sealed this 8th day of August, A. D., 1922.

[SEAL.] KARL FENNING,

*Acting Commissioner of Patents.*